United States Patent [19]

Göransson

[11] 4,083,909

[45] Apr. 11, 1978

[54] PROCESS FOR MANUFACTURING CELLULAR LIGHTWEIGHT CONCRETE PRODUCTS

[75] Inventor: Rolf Erik Göransson, Akarp, Sweden

[73] Assignee: Internationella Siporex Aktiebolaget, Malmo, Sweden

[21] Appl. No.: 624,079

[22] Filed: Oct. 20, 1975

[30] Foreign Application Priority Data

Oct. 31, 1974 Sweden ............................... 7413712

[51] Int. Cl.[2] .......................... C04B 15/14; B28B 3/00

[52] U.S. Cl. ........................................ 264/82; 83/100; 83/152; 214/6 A; 214/6 FS; 214/8.5 D; 264/101; 264/130; 264/131; 264/158; 264/333; 264/DIG. 57;; 264/DIG. 78

[58] Field of Search ............... 264/101, 157, 158, 335, 264/DIG. 57, 82, 333, 130, 131, DIG. 78; 214/6 FS, 8.5 D, 6 A; 83/100, 152

[56] References Cited

U.S. PATENT DOCUMENTS

| | | | |
|---|---|---|---|
| 2,531,990 | 11/1950 | Rappoli | 264/DIG. 57 |
| 2,725,611 | 12/1955 | Wissinger | 264/DIG. 57 |
| 2,971,239 | 2/1961 | Schaich | 264/157 |
| 3,395,204 | 7/1968 | Olsson et al. | 264/157 |
| 3,695,129 | 10/1972 | Vrijima | 83/152 X |
| 3,919,372 | 11/1975 | Vögele | 264/157 X |

*Primary Examiner*—Thomas P. Pavelko
*Attorney, Agent, or Firm*—Fred Philpitt

[57] ABSTRACT

Cellular lightweight concrete slabs are manufactured by cutting horizontally through a block of still plastic cellular concrete mass resting on a support. At each cut a single slice is separated from the lowermost portion of the block or the remainder thereof. After each completed cut the upper remainder of the block is elevated by means of a suction head, in order to expose the recently cut surfaces for a treatment, and then again deposited on top of the slice or slices already resting on the support. Rotary roller means are provided for contributing in the surface treatment.

6 Claims, 3 Drawing Figures

PROCESS FOR MANUFACTURING CELLULAR LIGHTWEIGHT CONCRETE PRODUCTS

Figure 1:
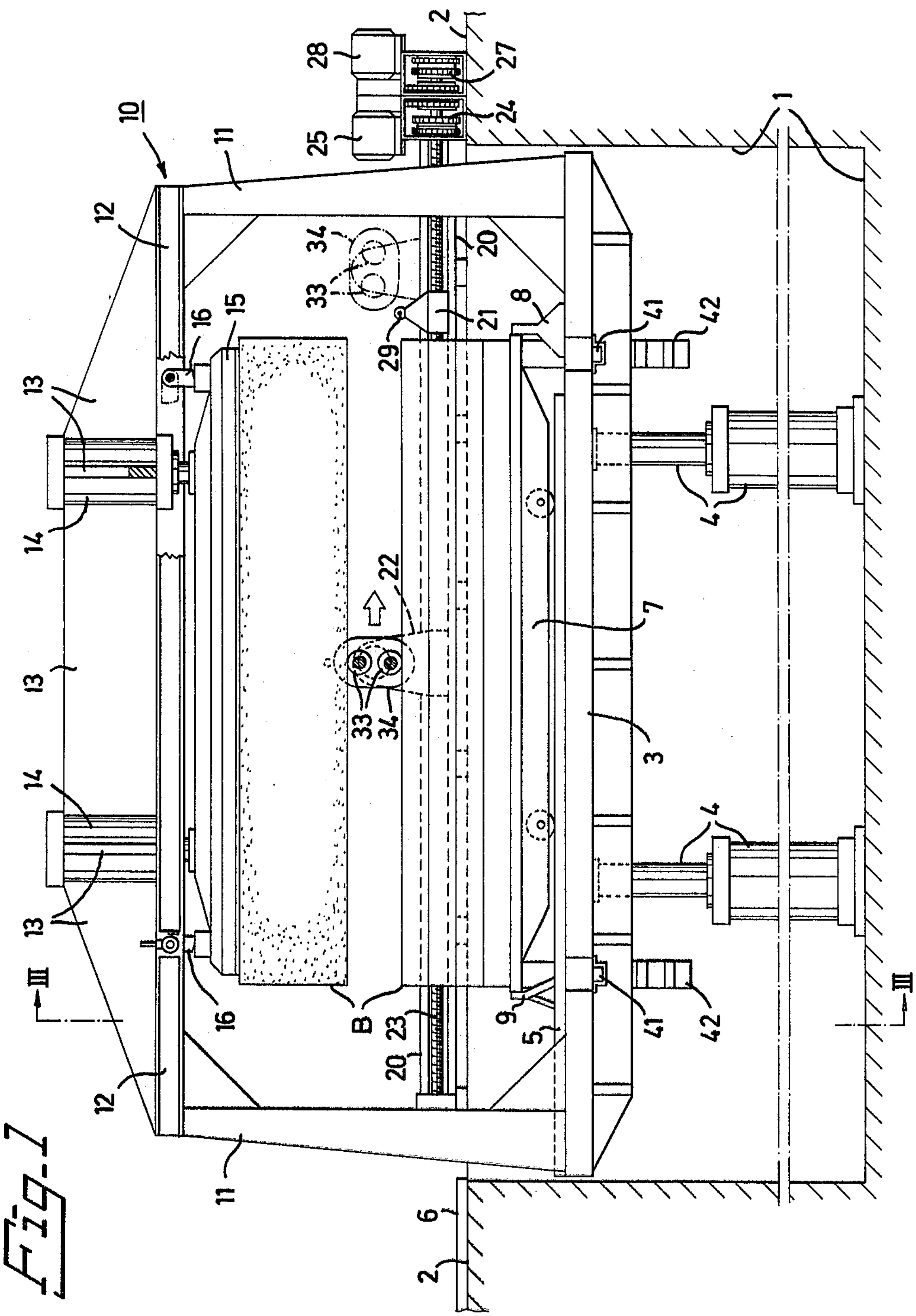

This invention is concerned with the manufacture of cellular lightweight concrete products and more specifically with that kind of process for such manufacture, which comprises the steps of first molding a cellular, self-supporting and at least generally parallelepipedic body of a concrete mass solidifying into a plastic state, dividing said body while the concrete mass thereof is still plastic into a plurality of slab-like slices resting on top of each other to form a pile by subjecting the body to several successive cutting operations, each including the making of one single horizontal cut through the body, at vertically spaced levels, and finally steam-hardening in a group the piled slab-like slices thus obtained. In carrying out such a process it is common practice to let the body rest on a movable support during the cutting operation and also to let the pile of body slices rest on the same movable support during the steam-hardening process.

The process defined above is a preferred and improved variant of a very old process of manufacturing cellular lightweight concrete products, in which all the horizontal cuts through the body were made in one single operation and in which there was a considerable risk of inadvertently cracking the various slices of the body and particularly the upper ones by subjecting them to a bending, which the relatively short cellular concrete mass cannot withstand in spite of its plasticity.

The invention suggests certain improvements in the process itself as well as an apparatus featuring certain novel combinations of means for carrying out the improved process, and it has for its main object to make possible a full exposure of every pair of recently cut surfaces obtained at each successive cut through the body not only for visual inspection but also and above all for any desirable surface treatment, before the division of the body is continued and, hence, well before the steam-hardening of the cut body is carried out. Such treatment of at least one of the cut surfaces of each body slice may be desirable for improving the quality of the slabs produced in one way or another as well as for preventing the piled slabs from binding together in an objectionable manner during the steam-hardening process.

To attain this object, the improved process according to the present invention is mainly characterized by the fact that the cutting operations are carried out in such a successive order that the lowermost horizontal cut through the body is made first, thereafter the next lowermost horizontal cut, and so on, and that, after each completed cutting operation, the remainder of the body located above the recently made horizontal cut by means of an elevatable gripping device adhering to the top face of the body by suction is temporarily lifted up from the recently cut off body slice resting on the support or, as the case may be, the pile of previously cut off body slices already resting thereon, before the next cutting operation is started after redeposition of the elevated remainder of the body.

The apparatus suggested by the invention as a means for carrying out the improved process is an apparatus for dividing a plastic, cellular and at least generally parallelepipedic body of concrete mass resting in a fully exposed position on a movable support. This apparatus is of the kind comprising a substantially rectangular bearing surface, on which the movable support with the body thereon is receivable, two holders located on opposite sides of said bearing surface and at a distance from each other exceeding the corresponding dimension of the body to be divided, a cutting wire stretched between said two holders and extending in a plane that is at least approximately horizontal, means for effecting a guided horizontal reciprocating motion between the body resting on its support on said bearing surface and said holders with the cutting wire between them in a direction that is lateral to the wire itself so as to cause said wire to cut through the body at each stroke, and means for changing the relative vertical position between said bearing surface and said holders with a cutting wire between them after each completed body-cutting stroke of said wire so as to cause said wire to cut through the body at different levels and, hence, to divide the body into a plurality of slab-like slices lying one on top of the other, and according to the invention the apparatus is characterized by, in combination with said beforementioned structure, a vertically movable suction head mounted above said bearing surface and adapted for engaging with and adhering by suction to the top face of the body to be divided while leaving all the vertical faces thereof substantially free, and means for elevating and lowering said suction head in order to effect, after each completed body-cutting stroke of said cutting wire, first a lifting of the uppermost part of the cut body and subsequently a redeposition thereof, before the next body-cutting stroke is started.

Figure 3:
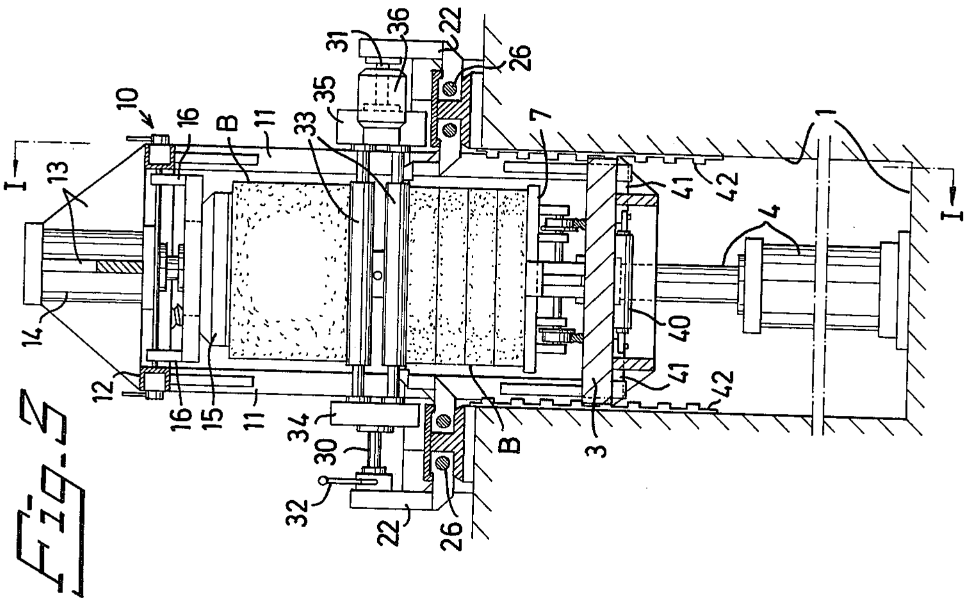
Figure 2:
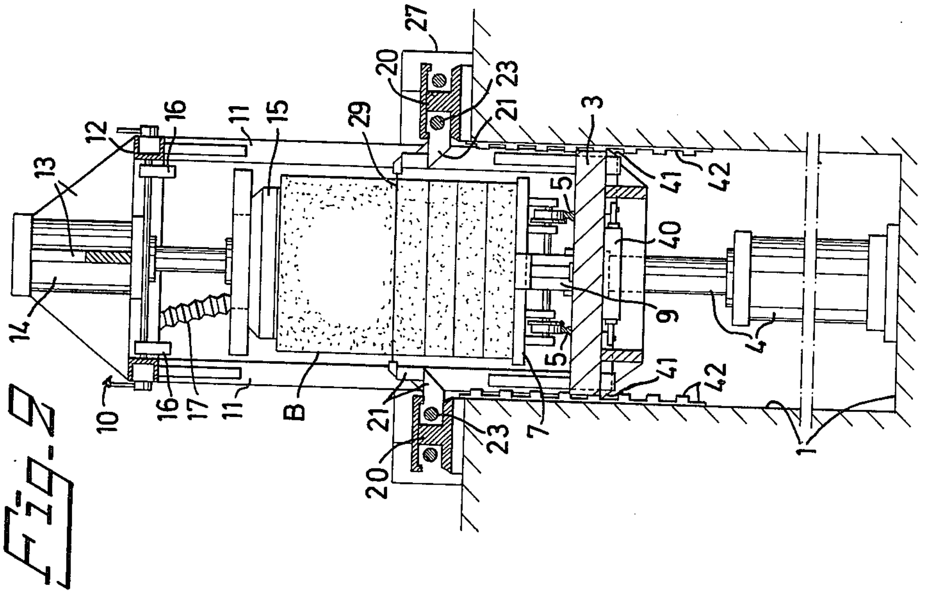

For further elucidation of the invention a preferred form of an apparatus embodying the same will now be described more closely with reference to the accompanying drawings, and in connection therewith the improved process will also clearly appear. In the drawings, FIG. 1 is a side elevation, partly in section and viewed from the line I—I in FIG. 3, of the apparatus illustrating also a certain operating step being carried out therein, FIG. 2 is a first sectional elevation taken along the line III—III in FIG. 1 and illustrating another operating step, and FIG. 3 is a similar second sectional elevation also taken along the line III—III in FIG. 1 and illustrating the same operating step as the one carried out in FIG. 1.

The apparatus shown in the drawings comprises a platform 3 forming a bearing surface that is vertically adjustable in a pit 1 in a factory floor 2. The platform 3 is supported by a pair of synchronously co-operating hydraulic jacks 4, by means of which it may be elevated and lowered between an upper level flush with the factory floor 2 and a lower level, in which the top face of the platform is at a distance below the factory floor exceeding the height of the still plastic, cellular lightweight concrete body B to be cut and worked in the apparatus. On top of the platform 3 there are provided a pair of rails 5, which in the uppermost position of the platform form a continuation of a pair of corresponding rails 6 on the factory floor 2 at one end of the pit 1. On these rails 5,6 a truck 7 serving as a movable support for the body B may be rolled in, on or out from, the platform, on which a fixed stop member 8 and a collapsible stop member 9 are provided for defining the position of the truck 7, so that the latter cannot move during the cutting and working of the body B thereon.

Secured on top of the platform 3 there is a stand structure generally designated by 10 and comprising four columns 11 supporting a rectangular frame 12 having a system of upstanding stiffening plates or fins 13 for supporting a pair of synchronously cooperating actuators 14 having downwardly projecting piston rods carrying a vertically movable suction head 15 serving as a gripping device. This suction head 15 is substantially rectangular, and its horizontal dimensions are only slightly smaller than the corresponding dimensions of the top face of the body B, with which the suction head is adapted to engage. It is to be noted that the suction head 15 leaves all the vertical faces of the body B entirely free.

By means of the actuators 14 the suction head 15 is vertically movable between an upper position, in which the bottom side of the suction head is at a considerable distance above the top face of the body B, when the latter is resting on the truck 7, and a lower position, in which the active bottom side of the suction head is in contact with the top face of the rested body. Abutment means 16, which are foldable out of the way when so required, are arranged in the frame 12 for limiting, in their operative, folded down positions, the upward movement of the suction head 15 for a purpose to be explained later on. The suction head 15 is through a flexible conduit 17 (FIG. 2) and through a suitable valve device, not shown, connectable to a source of negative pressure, also not shown, so that the suction head can be evacuated, when needed, and thereby be caused to grippingly engage with and firmly adhere to the top face of the body B.

On the factory floor 2 along the two longitudinal sides of the pit 1 there are provided a pair of parallel, double guideways 20. Each such guideway includes a first running race facing inwardly towards the pit and serving as a guide for a cutting wire holder 21, and a second outwardly facing running race serving as a guide for a slide 22 that is also movable along the pit but is entirely independent of the cutting wire holder. The two cutting wire holders 21 running on opposite sides of both the pit 1 and the platform 3 are synchronously driven to reciprocate along the guideways 20 by means of a pair of feed screws 23, both of which are connected through a first transmission 24 at one end of the pit 1 to a common motor 25. In a similar manner the two slides 22 are synchronously driven to reciprocate independently of the holders 21 along the guideways 20 by means of a pair of feed screws 26, both of which are connected through a second transmission 27 to a common motor 28. The second transmission is located close to the first transmission at the same end of the pit, as shown in FIG. 1. Between the two cutting wire holders 21, which are formed to pass freely on each one side of the body B resting on the truck 7 received on the platform 3, there is horizontally stretched a cutting wire 29, which, when the holders are driven by means of the feed screws 23, will be forced to cut horizontally through the body B at each stroke of the holders in a direction that is lateral to the wire itself.

The two slides 22, which, similarly to the cutting wire holders 21, are generally mirror pictures of each other, carry between them a unit that is turnable in either direction about horizontal pivot pins 30 and 31, and the angular position of which is adjustable by means of a lever 32 and lockable in a manner not shown. This turnable unit includes a pair of parallel and rotatable rollers 33, the axes of which are eccentrically located on diametrically opposite sides of the axis, about which the unit itself is turnable and which is represented by the pivot pins 30 and 31. The rollers 33 have their respective ends journalled in a pair of transmission housings 34 and 35 containing gears, not shown, for the transmission of rotary motion to and between the rollers, one of these two transmission housings 34 being secured to the pivot pin 30, whereas the other transmission housing 35 is secured to the pivot pin 31 and carries, in addition, a driving motor 36 for the two rollers.

The rollers 33 have an active length corresponding at least to the width of the cellular concrete body B, and the two transmission housings 34 and 35 are located entirely outside the path of travel of the two cutting wire holders 21. The mutual distance between the axes of the rollers 33 and the roller diameter, which may be the same for both the two rollers, are factors selected in a particular manner, as will appear from the following. Thanks to the eccentric location of the two rollers in the unit and the possibility of changing the angular position of said unit, it becomes possible for said unit to pass and change places with the cutting wire holders 21 and the cutting wire 29 after each completed stroke, in spite of the fact that the lower roller 33, when operative, with parts of its evenlope surface is at a lower level than the cutting wire. This is because of the fact that the two rollers 33, when being operative, are located at different levels, as best appears from FIG. 1, whereas they, after completion of each operating stroke, are brought to occupy a position at the very same level, as indicated by dash-and-dot lines to the right in FIG. 1, this being, of course, the result of a turning of the unit about the pivot pins 30 and 31.

In order to assure a correct level adjustment of the platform 3 in relation to the guideways 20, which is necessary for dividing the body B into slices of the desired thickness or thicknesses, the platform is on the lower side of each end portion thereof provided with a remotely controllable, double-acting cylinder mechanism 40 actuating on a pair of guided locking bolts 41 cooperating with each one rod 42 having teeth or knobs thereon. These rods 42, which all have the same spacing between their teeth or knobs and which, when required, are replaceable by corresponding rods having another tooth-spacing, are mounted in fixed vertical positions on the longitudinal side walls of the pit 1. At each lowering of the platform 3 the locking bolts 41 are first retracted and then again projected under the next tooth or knob on their respective rods. Actually, at each adjustment the platform is first lowered a small distance further than that corresponding to a slice thickness and then slightly elevated again in order to bring the locking bolts now again projected into engagement with the lower side of the next lower tooth or knob. When the division and working of the whole body B has been completed, the locking bolts 41 are retracted, of course, to let the platform 3 be elevated back to its uppermost position flush with the factory floor 2.

Already from the foregoing description of the apparatus it is believed to clearly appear that the plastic cellular lightweight concrete body B that is resting in a fully exposed position on the truck 7 received on the platform 3 is generally parallelepipedic in shape, has predetermined dimensions, and has been obtained by casting a charge of suitable concrete mass in a mold, the bottom of which may, but not necessarily must, be the platform of the truck 7. The top face of the body is supposed to be cleancut in advance so that it is smooth and flat, and so that the height of the body is suitably adjusted to the apparatus. Accordingly, the top face of the body will be at a level above the platform 3, where the suction head 15 can readily engage the same.

As a preparatory step in the operation of the apparatus, after the truck 7 with the body B resting thereon has been received and fixed on the platform 3, the suction head 15 is lowered into contact with the top face of the body and immediately evacuated in order to firmly adhere thereto by suction. Thereafter all the abutment means 16 are moved into a downwardly directed operative position to limit the subsequent upward movements of the suction head, before the cutting of the body into slices is started. Of course, the truck 7 with the body B thereon cannot be moved into place on the platform 3 unless the cutting wire holders 21 with the cutting wire 29 between them as well as the slides 22 with the roller unit between them are located over that end of the platform 3 that is closest to the transmissions 24 and 27.

Now, as a first operative step, the platform 3 is lowered to properly adjust the level of the cutting wire 29 relative to the body B for the first horizontal cut, and then the two cutting wire holders 21 with the cutting wire 29 between them are caused to move from the right to the left in FIG. 1 such a long stroke that the body is entirely cut through and the cutting wire becomes located just as much beyond the left hand end of the body as it is beyond the right hand end of the body in FIG. 1. Hereby a first, lower slice is separated from the body B. This first body slice does not necessarily need to be of the same thickness as the subsequent ones, because it frequently adheres with a considerable force to the top side of the platform of the truck 7, particularly if the body B has been molded and allowed to solidify into a plastic consistency on the truck, and cannot be used.

After the completion of the first cutting operation in the manner just described, the suction head 15 is elevated, whereby the part or remainder of the body B lying above the lowermost cut just made is lifted up, so that two cut surfaces just produced by the cutting wire 29 become separated from each other and fully exposed. Now at least one of these cut surfaces is subjected to a treatment changing the surface character, as will be explained later on, before the elevated remainder of the body, is again deposited on the first, lower slice by lowering the suction head as a preparation for the next cutting operation. This next cutting operation is preceded by a controlled lowering of the platform 3 and is carried out by causing the cutting wire 29 to again pass through the body, this time in the direction from the left to the right in FIG. 1. Thereafter the same elevation of the suction head 15 as before is repeated so that the new cut surfaces become separated from each other and exposed for suitable treatment. The cutting operations are then repeated in the same manner, until the entire body B has been divided up into the desired number of slices.

Since the cutting wire 29 at the end of the complete operating cycle must again be located to the left of the body B in FIG. 1 in order to let the body be moved out from the platform the same way as it entered, a returning of the cutting wire holders and the cutting wire may in certain cases be necessary. If so, such returning may take place after the suction head 15 has been disengaged from the top face of the body and elevated as far as possible after a folding away of the abutment means 16, and after the platform 3 has been lowered to its lowermost position, in which the cutting wires 29 as well as the unit including the rollers 33 may unimpededly pass between the suction head 15 and the top face of the body B.

The treatment of at least one of the two cut surfaces obtained at each cutting operation and separated from each other by the subsequent elevation of that part or remainder of the body B, which is above the recently made cut, may include one or several procedures having for its purpose to change the surface character of the cut surface so that the finished product will be better fit to meet practical demands. As examples of such procedures there may be mentioned a surface layer compacting operation, the provision of grooves or recesses in the cut surface, the application of an adherent coating, and the impression of surface reinforcing granules and/or fibres in the surface layer of the cut surface. Also combinations of such procedures are feasible. In addition, and in case of need, separating inert layers such as in the form of sheets or thin insert plates or even layers of spread-out sand or other release agents may, of course, be provided between the various body slices in order to prevent them from adhering to each other during the subsequent steam-hardening operation.

However, almost without exception there is required for changing and improving the surface character of the body slices or slabs a mechanical working of at least one and, preferably both the cut surfaces obtained at each cutting operation. Such a working can be effected by means of the reciprocatable unit including slides 22 and the rollers 33, which latter need not necessarily be smooth to give only a smoothing effect but may also be provided with, e.g., circumferential grooves or ridges or with projections or recesses in order to give a desired patterning effect.

In the apparatus here shown and described it is thus possible, after each successive cutting operation and subsequent lifting up of the remainder of the body B lying above the cut just made, to let the unit including the rollers 33 pass between the separated cut surfaces. When this is done, the unit is adjusted in such a manner by turning about the pivot pins 30 and 31 that the two rollers will come to engage each one cut surface, as appears from FIGS. 1 and 3. The two rollers are then suitably driven by the motor 36 in opposite directions and with a speed that is selected to give the desired rolling effect. Before or after such rolling the cut surfaces may be coated with granules or fibers spread over the surfaces by means of suitable nozzles. On the lower cut surface there may also be spread out a layer of a suitable coating composition, which by the aid of one roller 33 is worked into the cut surface. Also other forms of surface treatments are feasible.

It should be clear that the two rollers 33 do not necessarily need to be located straightly above each other during their operation. Accordingly, it is possible, by changing the angular position of the unit including the rollers, to adjust the depth of penetration of the rollers into the cut surfaces. Also, it is not necessary to let the two rollers be operative simultaneously, if this for one reason or another should be less desirable. In such case the unit including the rollers 33 may perform double strokes and return to its starting position at the end of each working operation. Nor is it always necessary to use two rollers, particularly not if only one cut surface in each cut is to be worked, but also in such case it is suitable to make the single roller eccentrically turnable in approximately the same manner as has been described hereinbefore so that its position relative to the cut surface can easily be adjusted and it may freely pass the cutting wire whenever this should be required.

I claim:

1. In the process of manufacturing cellular lightweight concrete products the combination of steps comprising:

(a) first molding a discrete, self-supporting but still plastic, cellular and generally parallelepipedic body of a concrete mass, (b) lowering an elevatable suction head into engagement with the top face of said body while the same is resting with its bottom face on a movable support, (c) causing said suction head to adhere to the top face of said body to thereby support the same from above without separating it from said movable support, (d) providing a first and lowermost horizontal cut through said body while it is thus supported from below and above to thereby separate from the remainder of said body held by said suction head a first body slice resting on said movable support, (e) temporarily separating the remainder of the body thus cut from said first body slice by increasing the vertical distance between said movable support and said suction head to thereby expose the recently cut surfaces, (f) deposing the upper remainder of the cut body on top of said first body slice by decreasing the vertical distance between said movable support and said suction head, (g) providing a second horizontal cut through said body at a level above said first cut while said body is again supported from below and above by said movable support and said adhering suction head, respectively, to thereby separate a second body slice resting on said first body slice, (h) again temporarily separating the upper body remainder, now reduced in height, from said second body slice to thereby expose the new cut surfaces of the second cut, (i) again deposing the upper reduced remainder of the cut body on top of the pile of body slices now resting on the movable support, (j) repeating the cutting, lifting and deposing steps until the entire body has been divided into the desired number of piled body slices before the last remainder of the body is released from said suction head, and (k) finally steam-hardening as a group the piled body slices thus obtained.

2. In a process of manufacturing cellular lightweight concrete products the combination of steps comprising:

(a) first molding a discrete, self-supporting but still plastic, cellular and generally parallelepipedic body of a concrete mass, (b) lowering an elevatable suction head into engagement with the top face of said body while the same is resting with its bottom face on a movable support, (c) causing said suction head to adhere to the top face of said body to thereby support the same from above without separating it from said movable support, (d) providing a first and lowermost horizontal cut through said body while it is thus supported from below and above to thereby separate from the remainder of said body held by said suction head a first body slice resting on said movable support, (e) temporarily lifting the remainder of the body thus cut from said first body slice by elevating said suction head to thereby expose the recently cut surfaces, (f) subjecting at least one of the two cut surfaces obtained at said first cutting operation to a treatment, (g) deposing the upper remainder of the cut body on top of said first body slice by again lowering said suction head, (h) providing a second horizontal cut through said body at a level above said first cut while said body is again supported from below and above by said movable support and said adhereing suction head, respectively, to thereby separate a second body slice resting on said first body slice.

(i) again temporarily lifting the upper body remainder, now reduced in height, from said second body slice resting on top of the first body slice to thereby expose the new cut surfaces of the second cut, (j) subjecting at least one of the two cut surfaces obtained at said second cutting operation to a treatment, (k) again deposing the upper reduced remainder of the cut body on top of the pile of body slices now resting on the movable support, (l) repeating the cutting, lifting, treating and redeposing steps until the entire body has been divided into the desired number of piled body slices, before the last remainder of the body is released from said suction head, and (m) finally steam-hardening as a group the piled body slices thus obtained.

3. The process according to claim 2 wherein the treatment of the cut surface includes compacting the surface layer.

4. The process according to claim 2 wherein the treatment of the cut surface includes the provision of grooves or recesses therein.

5. The process according to claim 2 wherein the treatment of the cut surface includes the application of an adhering coating thereto.

6. The process according to claim 2 wherein the treatment of the cut surface includes the impression of surface reinforcing particles into the surface layer.

* * * * *